United States Patent [19]

Lagowski

[11] 4,096,307
[45] Jun. 20, 1978

[54] ANTI-ABRASIVE FLAME-RESISTANT NOISE-SUPPRESSANT LAMINATE

[75] Inventor: Joseph V. Lagowski, Mabscott, W. Va.

[73] Assignee: Fairchild Incorporated, Raleigh, W. Va.

[21] Appl. No.: 811,371

[22] Filed: Jun. 29, 1977

[51] Int. Cl.² .......................................... B32B 15/06
[52] U.S. Cl. .................................. 428/214; 181/284; 181/290; 181/294; 428/213; 428/215; 428/462; 428/332
[58] Field of Search ............... 428/462, 332, 213, 214; 181/284, 290, 294

[56] References Cited

U.S. PATENT DOCUMENTS

| 2,764,516 | 9/1956 | Pace | 181/290 |
|---|---|---|---|
| 3,640,830 | 2/1972 | Oberst et al. | 428/213 |
| 3,640,833 | 2/1972 | Oberst et al. | 428/213 |
| 3,640,836 | 2/1972 | Oberst et al. | 428/213 |
| 3,674,624 | 7/1972 | Oberst et al. | 428/213 |
| 3,674,625 | 7/1972 | Oberst et al. | 428/213 |

FOREIGN PATENT DOCUMENTS

| 481,396 | 10/1938 | Germany | 428/462 |
|---|---|---|---|
| 1,900,525 | 7/1969 | Germany | 428/462 |

*Primary Examiner*—George F. Lesmes
*Assistant Examiner*—Edith R. Buffalow
*Attorney, Agent, or Firm*—Cushman, Darby & Cushman

[57] ABSTRACT

An anti-abrasive, flame-resistant, and noise-suppressant laminate suitable for use with underground scraper conveyors or the like comprising two outer layers of ferrous material having an inner layer of styrene butadiene rubber material vulcanized therebetween. The styrene butadiene rubber material has a durometer of the order of 59, a flame spread index of less than 25 according to ASTM-E162 and a thickness of the order of ¼ inch. One of the outer layers is of abrasive resistant steel and has a thickness of the order of ¼ inch. The other outer layer is of 1020 steel and has a thickness of 16 gage.

8 Claims, 4 Drawing Figures

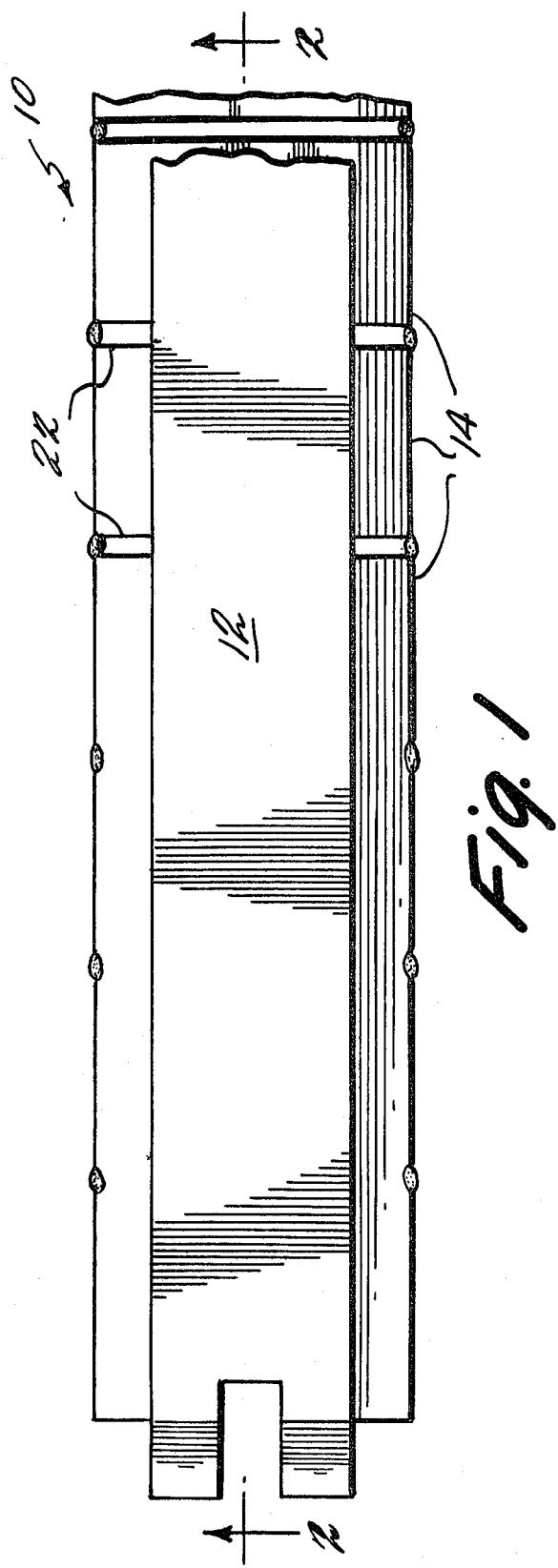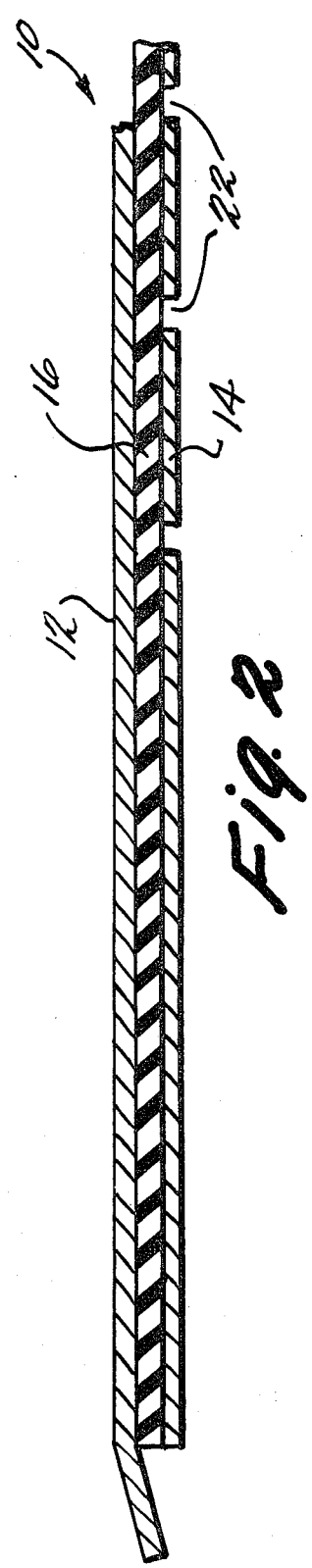

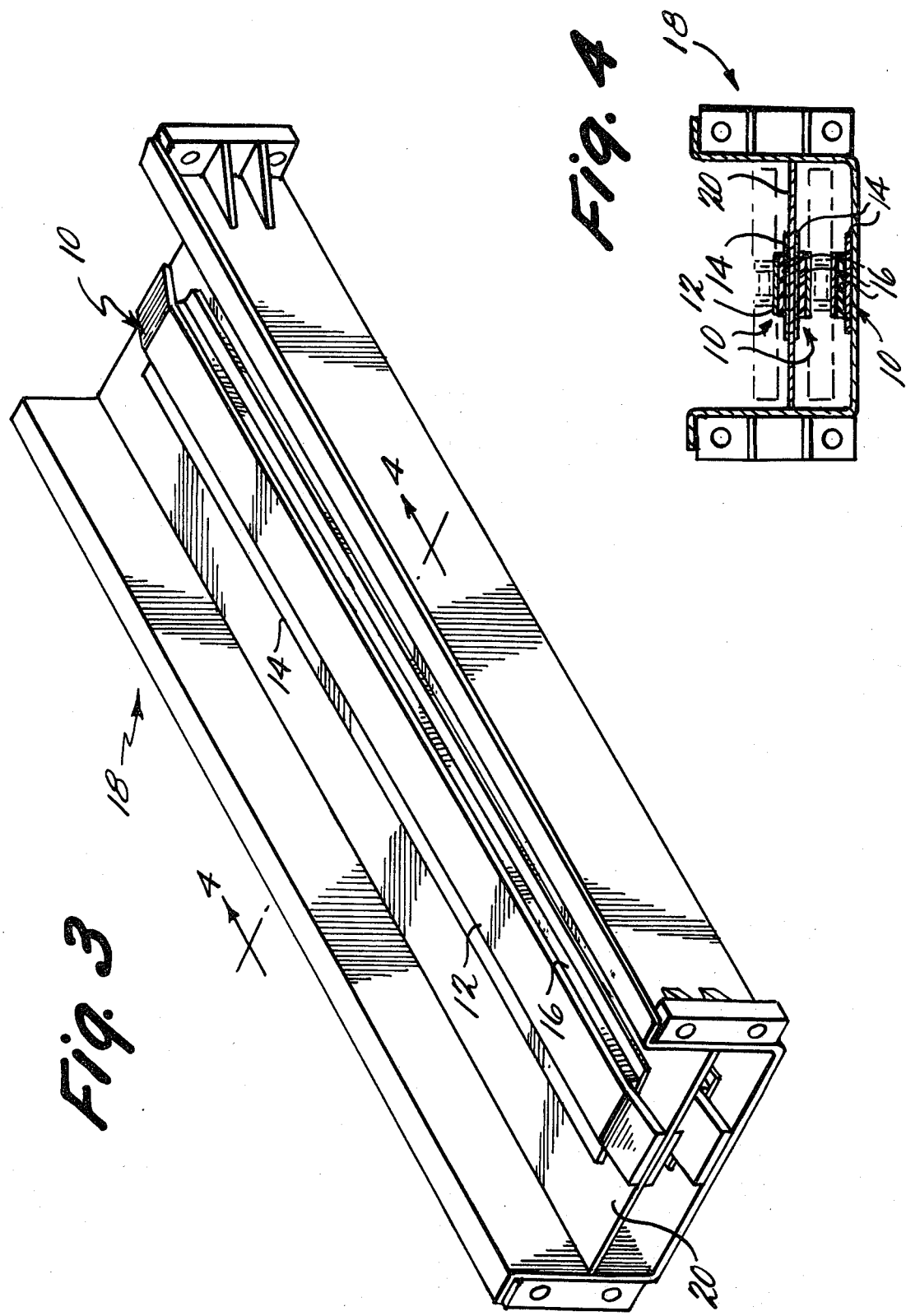

ANTI-ABRASIVE FLAME-RESISTANT NOISE-SUPPRESSANT LAMINATE

This invention relates to laminates and more particularly to flame-resistant laminates useful in imparting resistance to abrasion and noise-suppressant characteristics to moving mechanisms, such as conveyors and the like, especially conveyors of the scraper type utilized in underground mining equipment.

Laminates or sandwich systems are known which are useful in imparting noise-suppressant characteristics. Examples of laminates of this type disclosed in the patented literature are contained in the following U.S. Pat. Nos. 3,764,624; 3,674,625; 3,640,830; 3,640,833; and 3,640,836.

One application of such noise-suppressant laminates which presents severe requirements is in underground mining machinery. It has long been recognized that noise levels underground cannot be safely tolerated to the same extent as in other underground locations, due to the space confinement involved. In recent years, this recognition has been codified by the imposition of Federal safety rules and regulations administered by the Mining Enforcement and Safety Administration (MESA) of the United States Department of Interior.

Another severe condition encountered peculiarly in underground coal mines is the hazard of fire. It will also be evident that there is a greater need for ruggedness and dependability in underground equipment.

For all of the above specified reasons as well as other, the severity of underground conditions has necessitated the development of special laminates which will meet all of the stringent conditions encountered underground.

It is an object of the present invention to provide a laminate of the type described which does meet the stringent requirements of usage in underground mining machinery. In accordance with the principles of the present invention, this objective is obtained by providing two outer layers of steel having an inner layer of styrene butadiene rubber material vulcanized therebetween. One of the outer layers is of abrasive resistant steel and has a thickness of the order of ¼ inch. The styrene butadiene rubber material has a durometer of 59 and a flame spread index of less than 25 according to ASTM-E162. Preferably the inner layer has a thickness of the order of ¼ inch and the outer layer is of 1020 steel, having a thickness of the order of 16 gage.

It is a further object of the present invention to provide an anti-abrasive, flame-resistant and noise-suppressant laminate of the type described which is simple in construction, economical to manufacture and effective in operation.

These and other object of the present invention will become more apparent during the course of the following detailed description and appended claims.

The invention may best be understood with reference to the accompanying drawings wherein an illustrative embodiment is shown.

In the drawings:

FIG. 1 is a fragmentary top plan view of a laminate embodying the principles of the present invention;

FIG. 2 is a sectional view taken along the line 2—2 of FIG. 1;

FIG. 3 is an isometric view illustrating the use of the laminate shown in FIGS. 1 and 2 on a scraper conveyor frame; and FIG. 4 is a sectional view taken along the line 4—4 of FIG. 3.

Referring now more particularly to FIGS. 1 and 2 of the drawings, there is shown therein an anti-abrasive, flame-resistant and noise-suppressant laminate, generally indicated at 10, which embodies the principles of the present invention. The laminate 10 includes two outer layers 12 and 14 of ferrous material having an inner layer 16 of styrene butadiene rubber material vulcanized therebetween. The outer layer 12 is preferably of abrasive resistant steel and has a thickness of the order of ¼ inch. The outer layer 14 is preferably 1020 steel and has a thickness of the order of 16 gage. The inner layer 16 has a durometer of 58 to 60, a preferred durometer being of the order of 59. The material also has a flame spread index of less than 25 according to ASTM-E162. The layer 16 preferably has a thickness of the order of ¼ inch.

Styrene butadiene rubber material having the characteristics set forth above is manufactured by The Harrelson Rubber Company of Asheboro, North Carolina, and is sold under the trademark NO BURN ®.

As previously indicated,, the anti-abrasive, flame-resistant and noise-suppressant laminate 10 of the present invention is especially constructed to meet the stringent requirements necessary for underground mining equipment. A specific application is with respect to underground scraper conveyors. A typical embodiment of the laminate 10 for this purpose is configured as illustrated in FIGS. 1 and 2 in which the abrasive resistant steel layer 12 has a width of approximately 3 inches and a length of 120 inches. The 1020 steel layer 14 has a width of approximately 4½ inches with a length of approximately 118 inches. It will be understood that the exemplary dimensions noted above are for ten foot scraper conveyor sections, whereas the length dimension can be appropriately varied for scraper conveyor sections of 7 foot lengths.

It will be noted that the outer layer 12 which is narrower than the outer layer 14 is positioned centrally with respect to the latter. Moreover, the length of the outer layer 12 which exceeds the length of the outer layer 14 by two inches, is positioned so that each end extends outwardly of the associated end of the layer 14 a distance of approximately 1 inch. The inner layer of styrene butadiene rubber material 16 is vulcanized between the coextensive extent of the two outer layers. The vulcanization of the rubber material serves to intimately and tenaciously bond the surfaces of the inner layer 16 with the adjacent surfaces of the outer layers 12 and 14.

FIG. 3 illustrates a typical utilization of the anti-abrasive, flame-resistant and noise-suppressant laminate 10, in conjunction with a piece of underground mining equipment containing a scraper conveyor assembly. In FIG. 3 a section of the scraper conveyor frame is illustrated and indicated by the numeral 18. The scraper conveyor frame is of generally U-shaped cross-sectional configuration and includes a horizontal plate support 20 extending between the legs of the U-shaped frame section parallel with the bight portion thereof. It will be understood that in the normal operation of the scraper conveyor, an endless chain (shown in phantom lines in FIG. 4) having a series of laterally extending flight elements (also shown in phantom lines in FIG. 4) is mounted with respect to the frame 18 so that an operative upper flight of the chain slides along the upper surface of the plate 20 while a return flight slides along the upper surface of the bight portion of the U-shaped frame 18. Since the section 18 shown in FIG. 3 is a straight section the laminate 10 of the present invention is simply mounted on the central upper surface of both the plate member 20 and bight portion of the U-shaped section 18. In addition, as shown in the cross-section of FIG. 4, a third laminate 10 is mounted on the lower surface of the intermediate plate 20. The manner in which each laminate is mounted on the frame section is simply by spot welding opposite edges of the 1020 steel layer 14 to the appropriate plate surface at spaced locations, as, for example, every three inches. In addition, the overlapping end of the anti-resistant steel layer 12 is bent downwardly and appropriately spot welded.

In FIGS. 1 and 2 the laminate 10 shown therein has been modified to enable the same to be mounted on a curved scraper conveyor frame section. In this regard it will be noted that the laminate is provided with a series of spaced slots 22 which are formed by effectively removing an entire thin section of the 1020 steel layer 14. In mounting a modified laminate of this type the quarter inch abrasive resistant steel layer 12 is first appropriately bent to the desired shape, after having formed the slots 22 and then the slotted layer 14 is welded to the frame by spot welds at each end of each slot.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. An anti-abrasive, flame-resistant and noise-suppressant laminate suitable for use with underground scraper conveyors or the like comprising two outer layers of ferrous material having an inner layer of styrene butadiene rubber material vulcanized therebetween, said styrene butadiene rubber material having a durometer of the order of 59 and a flame spread index of less than 25 according to ASTM-E162, one of said outer layers being of abrasive-resistant steel and having a thickness of the order of ¼ inch.

2. An anti-abrasive, flame-resistant, and noise-suppressant laminate as described in claim 1 wherein said other outer layer has a thickness of the order of 16 gage.

3. An anti-abrasive, flame-resistant, and noise-suppressant laminate as described in claim 2 wherein said other outer layer is of 1020 steel.

4. An anti-abrasive, flame-resistant, and noise-suppressant laminate as described in claim 3 wherein said inner layer has a thickness of the order of ¼ inch.

5. An anti-abrasive, flame-resistant, and noise-suppressant laminate as described in claim 1 wherein said inner layer had a thickness of the order of ¼ inch.

6. An anti-abrasive, flame-resistant, and noise-suppressant laminate as described in claim 5 wherein said other outer layer is of 1020 steel.

7. An anti-abrasive, flame-resistant, and noise-suppressant laminate as described in claim 5 wherein said other outer layer has a thickness of the order of 16 gage.

8. An anti-abrasive, flame-resistant, and noise-suppressant laminate as described in claim 1 wherein said other outer layer is of 1020 steel.

* * * * *